Oct. 18, 1966  F. C. KERR ETAL  3,279,189
IGNITER SAFETY AND ARMING DEVICE
Filed July 11, 1963  4 Sheets-Sheet 1
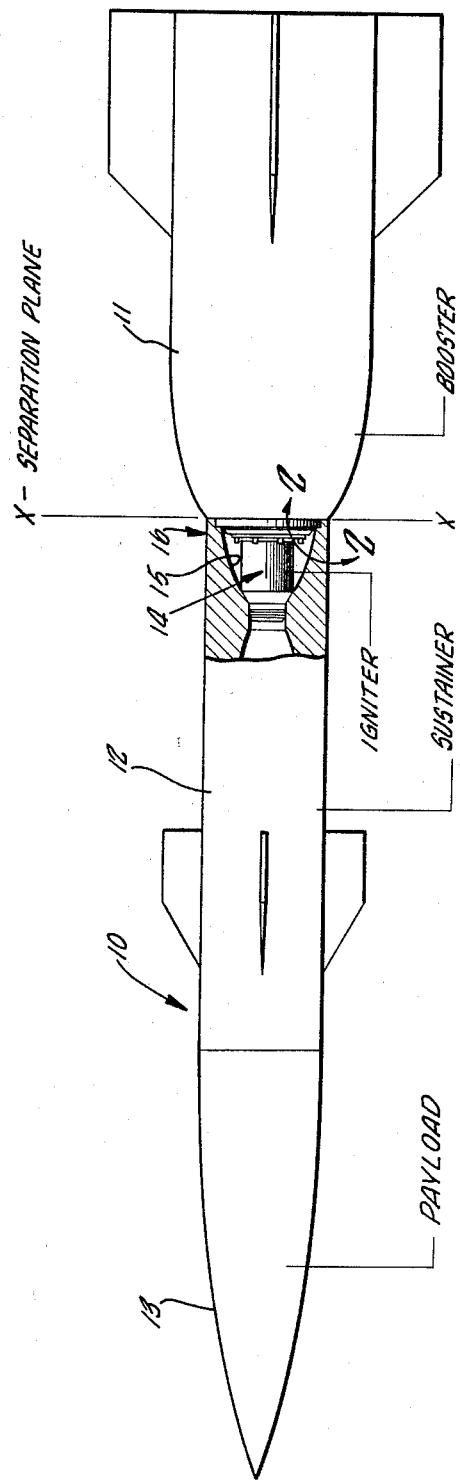
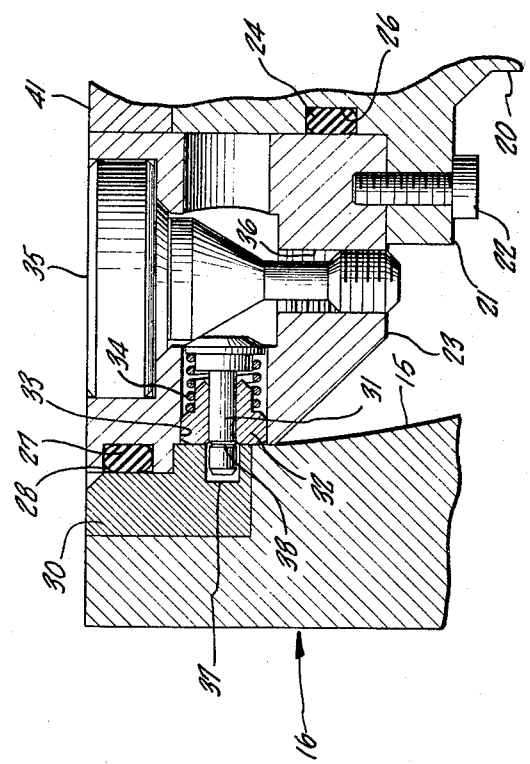
INVENTORS.
FRANK C. KERR
BEN R. TALLEY
BY
*Christie, Parker & Hale*
ATTORNEYS

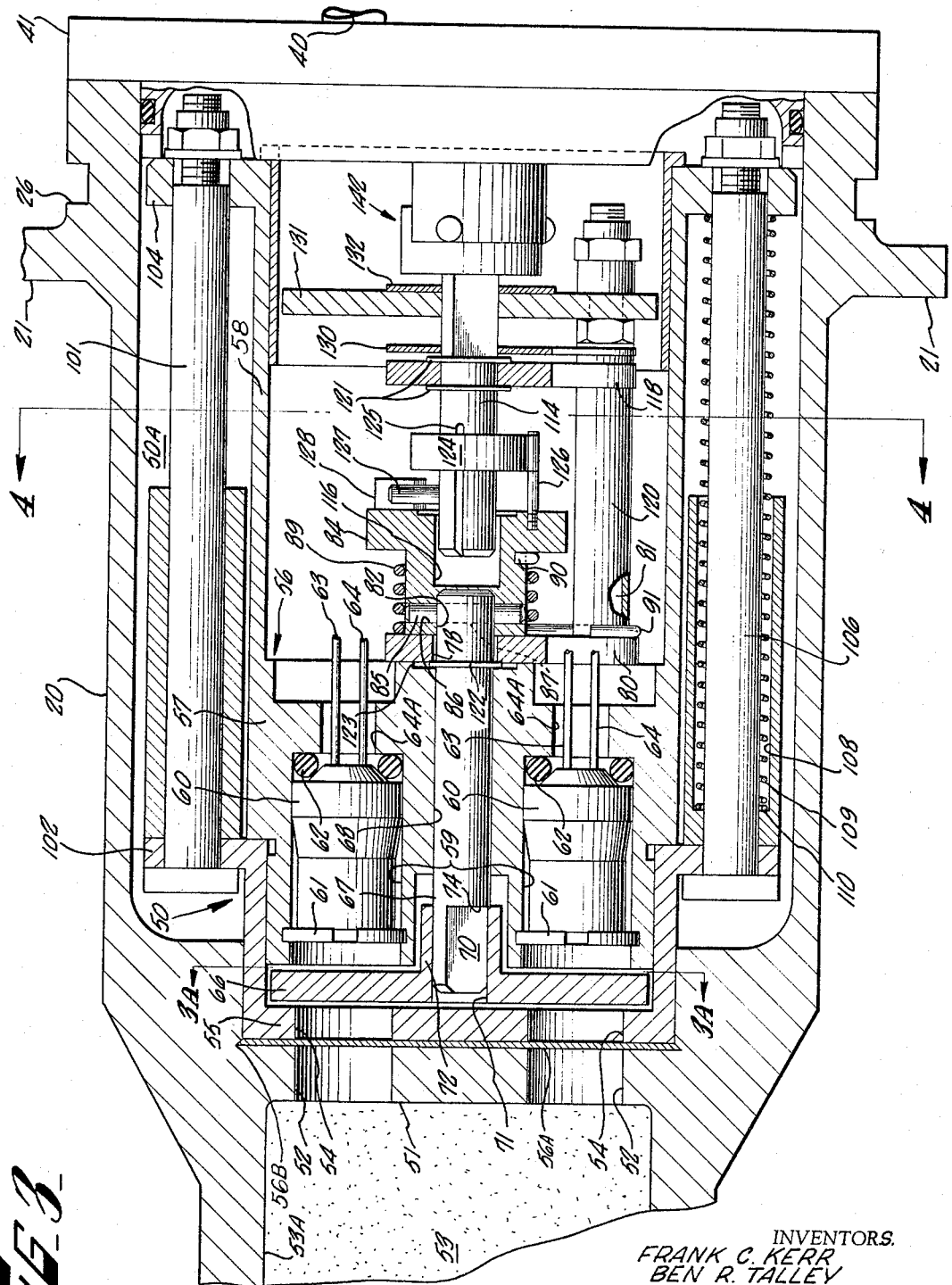

INVENTORS.
FRANK C. KERR
BEN R. TALLEY
BY
Christie, Parker & Hale
ATTORNEYS.

Oct. 18, 1966  F. C. KERR ETAL  3,279,189
IGNITER SAFETY AND ARMING DEVICE
Filed July 11, 1963  4 Sheets-Sheet 4
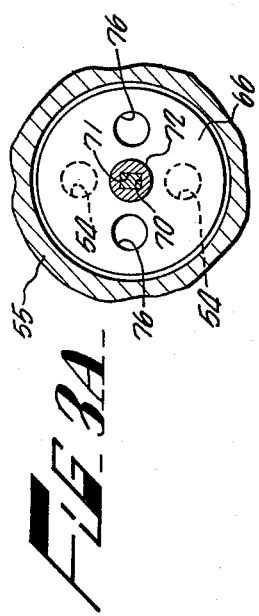
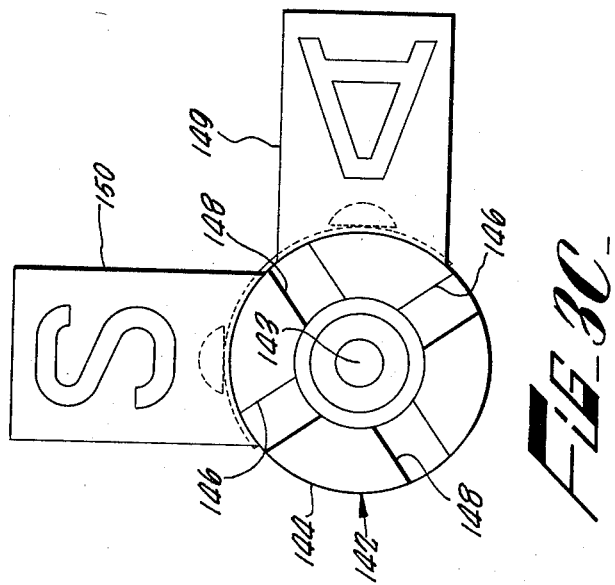
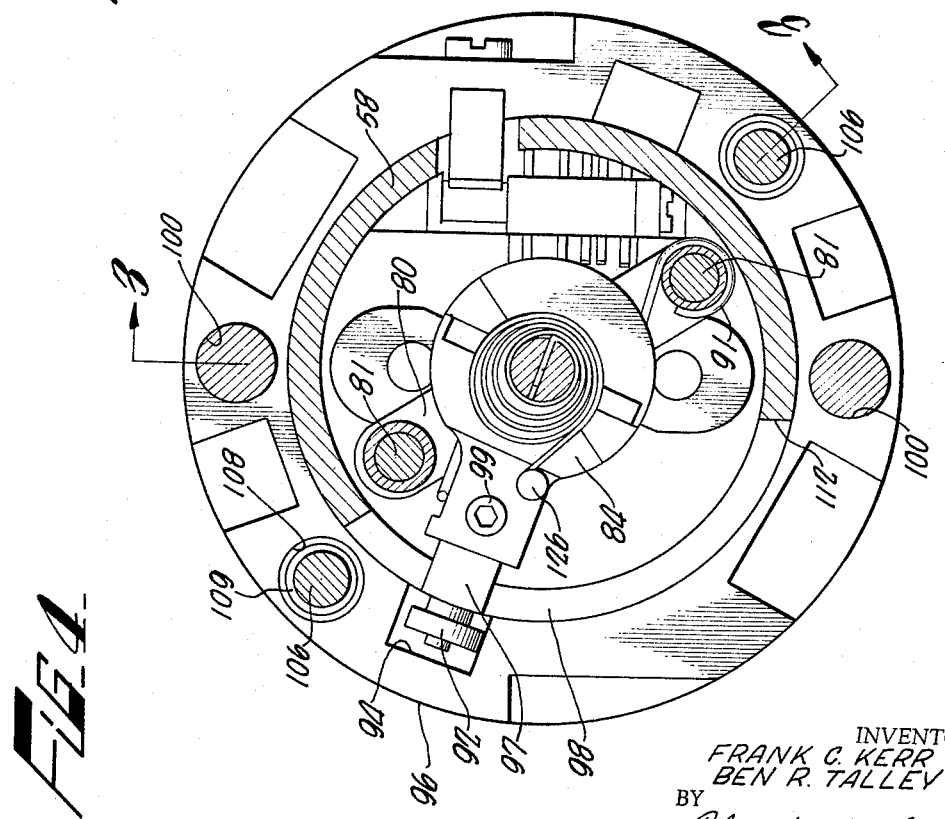
INVENTORS.
FRANK C. KERR
BEN R. TALLEY
BY
Christie, Parker & Hale
ATTORNEYS.

3,279,189
IGNITER SAFETY AND ARMING DEVICE
Frank C. Kerr, Arcadia, and Ben R. Talley, Covina, Calif., assignors to Wallace O. Leonard, Inc., Pasadena, Calif., a corporation of California
Filed July 11, 1963, Ser. No. 294,373
4 Claims. (Cl. 60—256)

This invention relates to igniters for rocket engines, and to arming mechanisms for the igniters.

At the present time, the main propellant charge in a rocket engine is ignited by the detonation of a relatively small primer charge held in an igniter attached to the rocket. The igniter must be reliable, and must not be detonated inadvertently. Moreover, the igniter preferably should be jettisoned once the rocket engine is ignited to reduce and increase the range of the rocket.

This invention provides a rugged igniter which is positive in its operation and which is reliably ejected from the rocket once the ignited has been detonated, and the main propellant charge ignited.

The igniter of this invention is constructed to be sealed over the nozzle outlet of the rocket engine until the igniter is detonated and ignites the rocket motor propellant, which develops a sharp rise in pressure in the rocket motor chamber, causing the igniter to be blown out of the nozzle and leave it clear for normal operation. Thus, with this invention, the igniter can be securely but releasably mounted in the rocket nozzle to seal the nozzle so that a relatively large force is developed sharply to blast the igniter out of the nozzle when the rocket is fired, thereby insuring positive jettisoning of the igniter and reduction in rocket weight for flight.

In the preferred form of the invention, the igniter is sealed by gaskets in the nozzle outlet and is held in place by shear pins which are sheared when the rocket engine is ignited. Preferably the igniter includes a housing which fits into the nozzle opening, and has an outwardly extending flange at its rear end that fits snugly around the nozzle perphery to seal it. In one form, an adapter ring is bonded to the rocket motor case, and the igniter is secured to a mounting ring which is releasably attached by shear pins to the adapter ring.

The igniter is preferably provided with an arming mechanism which locks the igniter in a safe position until ready for use. When the igniter is used in a sustaining stage of a rocket put into flight by a booster stage, the arming mechanism is preferably activated by an inertia-senstive system only after the igniter has been subject to acceleration of the proper level and duration to insure satisfactory launching of the rocket.

In the presently preferred arming mechanism, a movable baffle is secured over a primer chamber mounted on the frame to carry a primer charge which is detonated when required to ignite the main propellant in the rocket sustainer stage. Means are provided for moving the baffle to uncover the primer chamber when the primer charge is to be detonated. Switching means activate a primer circuit in response to movement of the baffle to uncover the primer chamber so the primer charge can be detonated on receipt of a proper electrical signal.

In many instances, it is desirable to check the operation of the igniter prior to installation in a rocket by subjecting the igniter to an acceleration, say, in a centrifuge, which should be sufficient to arm the device. In such cases, it is imperative that switching means be returned from an armed to a safe condition. Accordingly, the arming mechanism of this invention includes means for manually deactivating the primer circuit after it has been activated by acceleration, and for returning the baffle to cover the charge in the primer chamber. The preferred device also includes a movable indicator attached to the switching means to indicate whether the device is in the armed or in the safe condition.

Once an arming mechanism has been properly tested and installed in a rocket, it is desirable to check it periodically to ascertain that the circuit has proper continuity when in the armed condition. Accordingly, means are provided for activating the primer circuit without moving the baffle to uncover the primer chamber. During such tests, a small electrical signal is applied to the primer circuit to insure its proper condition. If the signal should inadvertently be large enough to detonate the primer charge, the main propellant must not be ignited. To prevent such an accident, the preferred embodiment of the device includes a front plate disposed over the primer chamber and having an opening aligned with the chamber. The baffle is mounted between the primer chamber and the front plate, and is also movable in a direction toward and away from the plate, and is also movable in a transverse direction to permit the primer chamber to be uncovered when desired. However, if the primer charge is detonated with the baffle covering the primer chamber, the explosion in the primer chamber drives the baffle toward the front cover and jams the baffle into the front cover opening so that all of the gas from the detonation of the primer is contained within the ignited unit, and the man rocket propellant is not ignited.

Preferably, the baffle is rotated between an armed and a safe position upon a rotatable shaft mounted on the frame, and the baffle is movable longitudinally along the axis of the shaft to effect the seal just described and contain all gas in case of an inadvertent detonation of the primer.

These and other aspects of the invention will be more fully understood from the following detailed description and the accompanying drawings in which:

FIG. 1 is a schematic elevation, partly in section, of an igniter installed in a 2-stage rocket in accordance with this invention;

FIG. 2 is an enlarged view taken in the area 2—2 of FIG. 1;

FIG. 3 is a sectional elevation, partly broken away, taken on line 3—3 of FIG. 4 of the presently preferred embodiment of the inertia-sensitive arming mechanism;

FIG. 3A is a view taken on line 3A—3A of FIG. 3;

FIG. 3C is a view taken on line 3C—3C of FIG. 3B;

FIG. 4 is a view taken on line 4—4 of FIG. 3; and

Figure 3B:
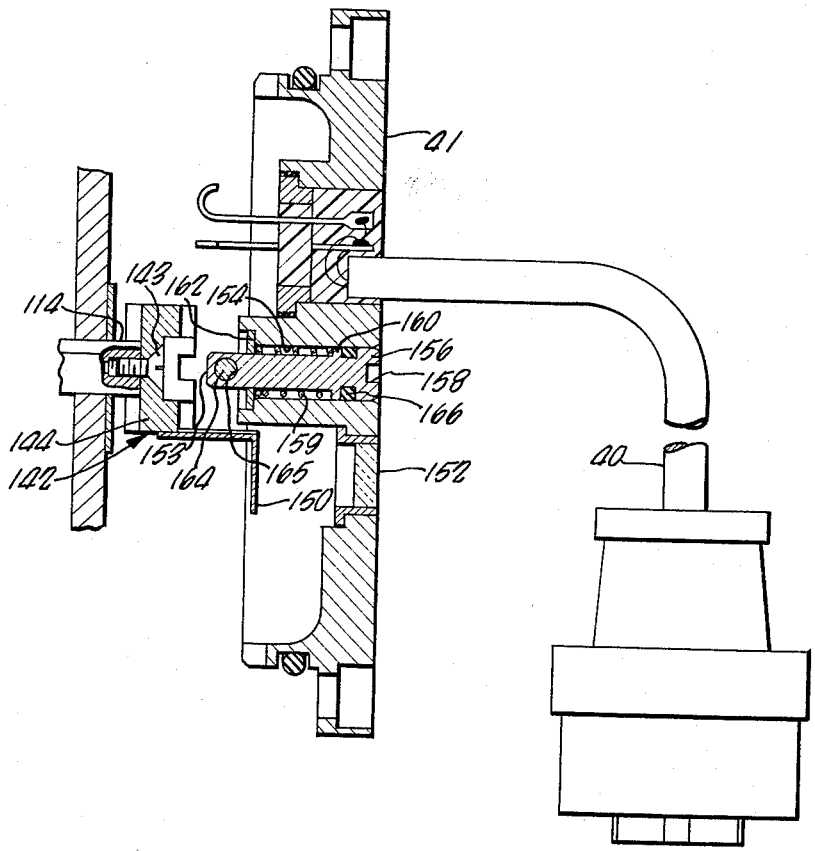
FIG. 3B is a fragmentary sectional elevation of the rear end of the igniter.

Referring to FIG. 1, a typical rocket 10 includes a booster stage 11, a sustainer stage 12, and a payload 13.

The booster stage is fired in a conventional fashion, and after it has burned out, it is detached from the rest of the rocket at a separation plane X—X, i.e., at the rear of the sustainer stage, which includes an igniter 14 mounted in the throat 15 of a nozzle 16 formed at the rear end of the sustainer stage. As shown best in FIG. 2, the igniter includes a hollow housing 20 with an outwardly extending annular flange 21 formed at its rear end and secured by screws 22 to an outwardly extending annular mounting ring 23. An O-ring 24 in an outwardly opening annular groove 26 around the housing makes a weather-tight seal against the interior of the annular mounting ring. The outer periphery of the mounting ring includes an outwardly-opening annular groove 27 which contains an O-ring 28 that makes a weather-tight seal against the inside of an annular adapter ring 30 and rigidly bonded to the rocket motor nozzle of the sustainer stage. The mounting ring is prevented from moving longitudinally with respect to the adapter ring by a plurality of outwardly extending shear pins 31 each mounted in a respective guide sleeve 32 disposed in a lateral bore 33 through the mounting ring.

A shear pin compression spring 34 is disposed around each guide and bears against the head of its respective shear pin to urge the shear pin inwardly against a respective cam screw 35 screwed into a longitudinal threaded bore 36 in the mounting ring. With the igniter mounted as shown in FIG. 2, the outer end of each shear pin extends into an inwardly opening annular shear pin groove 37 on the inner periphery of the adapter ring. Each shear pin includes an annular groove 38 flush with the inside face of the adapter ring adjacent the shear pin groove so that when the igniter housing receives a sharp rearward thrust, the shear pins are sheared at the grooves 38 and permit the igniter to be ejected from the rocket nozzle.

A conventional electrical cable harness 40 (FIGS. 3 and 3B) is sealed through a rear cover plate 41 over the rear end of the igniter, and supplies electrical power to the interior of the igniter as described in more detail below to ignite the main propellant (not shown) in the sustainer stage, assuming that the booster stage has fired properly and been jettisoned. The rear end of the rocket motor nozzle is sealed by the igniter and its flange so that no gas can escape from the sustainer stage until sufficient pressure is developed in the main rocket motor chamber to shear the shear pins and blast the igniter from the nozzle, leaving it open for normal operation.

With this arrangement, the igniter can be ruggedly installed in the sustainer stage to prevent unwanted loosening during the flight of the rocket produced by the booster stage, Since the full force of the sustainer rocket motor chamber pressure is brought to gear against the igniter when the sustainer stage is fired, even the relatively rugged mounting of the igniter is sheared loose, so that the igniter is jettisoned to reduce the weight of the rocket for its further flight.

FIGS. 3, 3A, 3B, 3C, and 4 show a presently preferred embodiment of an arming mechanism 50 mounted in a rear compartment 50A in the igniter housing 20. As shown best in FIG. 3, the forward (left, as viewed in FIG. 3) end of the igniter housing includes an internal transverse circular partition 51, which includes a pair of ports or openings 52 that provide communication between the main propellant charge 53 located in a forward compartment 53A forward of the partition and a pair of openings or ports 54 through a front plate 55 mounted over the forward end of an arming frame 56. The ports in the partition are collinear with those in the front plate, but a thin flexible rupture disc 56A in an annular groove 56B just to the rear of the partition forms a temporary seal between the ports.

Figure 5:
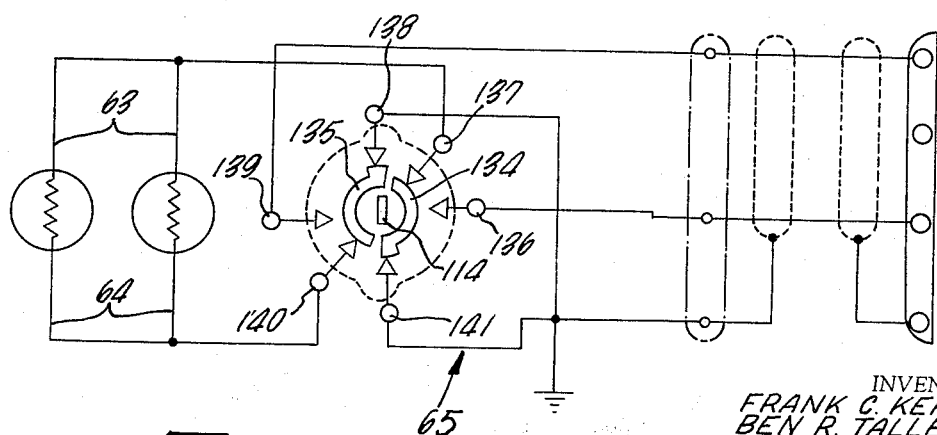
FIG. 5 is a schematic diagram of a circuit used to detonate the primer charge in the igniter.

The arming frame includes a cylindrical body 57 at its forward end, and a rearwardly extending annular skirt 58. A pair of longitudinally extending primer chambers 59 open out of the forward end of the body to be collinear with the ports in the front plate and the partition. A separate primer charge 60 is held in each primer chamber by a respective C-ring 61. The rear end of each primer seats on a separate O-ring gasket 62 in the rear end of each chamber. Each charge includes a pair of electrical leads 63, 64 which extend rearwardly through respective opening 64A in the rear of the body. The leads are connected as shown in FIG. 5 to a firing circuit 65. A circular baffle 66 is mounted between the front plate and forward end of the body of the frame on a longitudinal rotatable baffle shaft 67 which extends rearwardly through an opening 68 in the frame body. The forward end of the baffle shaft includes a longitudinal tongue 70 which extends into a matching longitudinal groove 71 through a rearwardly extending hub 72 formed integrally with the central portion of the baffle. The hub makes a slip fit on the baffle shaft so it is free to slide forward longitudinally relative to the shaft against the rear face of the front plate, when subjected to a force in that direction. The baffle is limited in its travel in the rearward direction by an outwardly extending shoulder 74 on the baffle shaft which engages the rear end of the hub as the baffle tends to move rearwardly so that the baffle does not drag on any parts when in the position shown in FIG. 3 and the shaft is rotated as described below.

As shown best in FIG. 3A, the baffle includes a pair of diametrically opposed openings or ports 76 which are each 90° from the collinear ports in the partition and front plate when the baffle is in the "safe" position shown in FIGS. 3 and 3A. Thus, if the primer charges are accidentally detonated with the baffle in the safe position, the explosion from the primer drives the baffle forward against the rear surface of the front plate. The high temperature and pressure resulting in the chamber from the primer causes a localized lowering of the tensile strength of the baffle material, which may be steel. The pressure on the rear face of the baffle causes a slight plastic flow of the baffle material into the ports of the front plate, which forms a seal adequate to prevent rupture of the thin disc 56A between the partition and the front plate.

The baffle shaft extends rearwardly through a central opening 78 in a forward transverse bearing plate 80 secured at its opposite ends around the forward ends of respective studs 81 extending rearwardly from the rear face of the body. The rear end of the baffle shaft terminates in a forwardly opening bore 82 of a shaft rotor 84 and is secured to the rotor by a cross pin 85 which extends through collinear transverse bores 86 and 87 in the rotor and the rear end of the baffle shaft. A coil spring 89 disposed around the rotor is secured at one end 90 into the side of the rotor and at its other end 91 around one of the studs 81 so that the rotor spring tends to rotate the rotor and baffle shaft in a clockwise direction, as viewed in FIG. 3A.

Rotation of the rotor and baffle shaft when the arming device is in the safe position shown in FIGS. 3 and 4 is prevented by a rotor roller 92 disposed in an inwardly opening longitudinally restraining slot 94 in an annular weight 96 disposed around the body and skirt of the frame. The roller is attached to the outer end of a rotor arm 97 which extends through an arcuate slot 98 in the skirt and is rigidly attached at its inner end by a set screw 99 to the rotor.

The annular weight includes a pair of diametrically opposed longitudinal guide bores 100 through which extend guide pins 101 secured at their opposite ends through outwardly extending flanges 102 and 104 on the front plate and the rear end of the skirt, respectively. As shown best in FIG. 3, the guide pins make a close sliding fit in their respective bores through the weight, and the weight is slightly spaced from the skirt so that the weight is free to slide longitudinally and rearwardly with respect to the frame as the frame is accelerated in a forward (to the left, as viewed in FIG. 3) direction.

A pair of diametrically opposed spring pins 106 are mounted at their opposite ends through the flanges on the front plate and skirt, and extend through oversized spring bores 108 in the weight. Each spring bore receives the forward end of a respective compression bias spring 109 disposed around each spring pin. The forward end of each compression spring bears against an internal shoulder 110 in its respective bore 108, and the rear end of each spring bears against the flange on the skirt. Thus, the weight is urged to its most forward position against the front plate flange by the spring as shown in FIG. 3. As shown best in FIG. 3, the front plate is secured firmly against the front end of the frame by the guide pins and spring pins secured through the respective flanges on the plate and the frame skirt.

When the frame is accelerated forward (to the left, as viewed in FIG. 3), the weight tends to move rearwardly and compress the bias springs. When the frame is subjected to a forward acceleration of a sufficient duration and amount, the weight is forced rearwardly until it bears against the skirt flange. Just before the weight reaches the skirt flange, the roller on the rotor shaft arm clears the forward end of the longitudinal restraining slot 94 in the weight, and permits the rotor spring to rotate the rotor, baffle shaft, and baffle 90° in a counterclockwise direction (as viewed in FIG. 4) until the rotor arm engages a stop face 112 at one end of the arcuate slot in the skirt. This stops the rotation of the shaft 90° from its original safe position so that the ports in the baffle are now aligned with those in the front plate and the partition. Thus, when the primer charges are detonated, the thin disc is ruptured, permitting ignition of the main propellant charge.

When the roller on the rotor arm is released from the restraining slot, the roller rolls along the forward face of the weight until it strikes the stop face 112, and in this position the weight is now locked down in the armed position so that the igniter remains armed even when subjected to severe positive and negative acceleration.

The forward end of a longitudinal switch shaft 114 extends into a rearwardly opening bore 116 of the rotor to be collinear with the baffle shaft. The rear end of the switch shaft extends through a rear bearing plate 118 secured at its opposite ends to the rear portion of the studs 81 and spaced from the forward bearing plate by spacer sleeves 120 disposed around each stud and between the plates. The switch shaft is prevented from longitudinal movement by a pair of snap rings 121 secured to the shaft on opposite faces of the rear bearing plate. The rotor shaft is prevented from the longitudinal movement by snap ring 122 secured around it just forward of the forward bearing plate in a rearwardly opening recess 123 in the rear face of the frame body where the front face of the forward bearing plate bears against the rear end of the body.

A coil clutch spring 124 is disposed around the switch shaft and secured at its inner end in a longitudinal slot 125 in the shaft, and at its outer end by a retaining screw 126 to the rear face of the rotor. The clutch spring urges the switch shaft to rotate in a clockwise direction (as viewed in FIG. 4) so that a transverse pin 127 secured to the rear portion of the switch shaft is urged against a rearwardly extending stop 128 on the rotor.

The rear end of the switch shaft extends through a transverse switch deck insulator 130 and a transverse circular switch deck 131 secured at diametrically opposed points to the rear ends of the studs. A switch armature 132 is mounted on the rear end of the switch shaft adjacent the rear face of the switch deck so that a pair of conductor bars 134, 135 on the switch armature are moved by rotation of the switch shaft to be brought into contact with various ones of six electrical terminals 136, 137, 138, 139, 140, and 141, disposed around the arcuate bars 134, 135, as shown in FIG. 5.

A position indicator 142 (FIG. 3B) is secured by a flat head screw 143 through a central hub 144 on the indicator to the rear end of the switch shaft 114. As shown best in FIG. 3C, the position indicator hub includes a pair of rearwardly opening cross slots 146, 148, and a pair of flags 149, 150, extending at right angles to each other and parallel to the rear cover plate 41 (FIG. 3B). When the switch shaft is in the safe position, flag 150 is disposed under a transparent window 152 in the rear cover plate, so that the letter "S" on the rear face of the flag 150 is visible through the window.

A longitudinal safing pin 153 extends rearwardly through a stepped bore 154 in the center of the rear cover plate and terminates in a head 156 having a screwdriver slot 158. A compression spring 159 around the safing pin bears at its rear end against an outwardly extending flange 160 formed intergrally with the pin and spaced forward of the pin head. The forward end of the spring bears against a washer 162 staked in the forward end of the stepped bore 154. Thus, the spring urges the safing pin rearwardly to the position shown in FIG. 3B, so that a transverse cross pin 164 press-fitted through a transverse bore 165 in the forward end of the safing pin bears against the annular portion of the rear cover plate around stepped bore 154. An annular gasket 166 between the flange 160 and safing pin head 158 makes a weather-tight seal between safing pin and the rear cover plate.

The safing pin is used to rotate the switch armature 90° in a counterclockwise direction from the safe position shown in FIG. 5 to the armed position, without requiring the uncovering of the primer chambers by the baffle. This is accomplished by pushing safing pin 158 forward with a screwdriver until its cross pin 164 engages slot 146 in the hub of the position indicator. The safing pin is then rotated clockwise 90° to turn the switch shaft against the action of the clutch spring. The cross pin 127 on the forward end of the switch shaft moves away from the stop 128 on the rotor, but the rotor, baffle shaft, and baffle do not turn because they are held in a safe position by the rotor spring. With the safing pin holding the switch shaft in the armed position, i.e., with the "A" flag on the position indicator under the window in the rear cover plate, a small testing signal is applied to the firing circuit to insure that there is circuit continuity in the armed position. The test signal is insufficient to detonate the primer. However, if an abnormally large test signal should be accidentally applied to the firing circuit and detonate the primer, the device will fail safe because the baffle will not have uncovered the primer chambers. The detonation in the primer chambers, as previously described, will blast the baffle against the front plate and effect a gas-tight seal adequate to prevent rupture of the thin disc and thereby prevent ignition of the main propellant. The circuit is returned to the safe position by withdrawing the screwdriver from the safing pin. The clutch spring rotates the switch shaft 90° clockwise, as viewed in FIG. 5, to return the switch rotor to the safe position. The "S" flag is now under the window in the rear cover plate.

The igniter is armed when subjected to sufficient acceleration to drive the weight rearwardly sufficiently far to release the rotor roller from the restraining slot in the weight. The rotor spring then forces the baffle, the baffle shaft, switch shaft, switch armature, and baffle to all rotate together 90° clockwise so that the baffle ports are over the primer chambers and so the switch rotor is moved to the firing position. The application of a firing signal to terminals 136 and 139 causes the primer to detonate and ignite the main propellant charge.

It is also sometimes desirable or necessary to test the arming mechanism by subjecting it to acceleration in a centrifuge to insure that it works properly. In such instances, a properly functioning igniter becomes armed when subjected to the required acceleration prior to installation in a rocket. The safing pin permits the armed igniter to be manually safed by pushing in the safing pin until its cross pin engages slot 148 in the position indicator. The safing pin is then rotated 90° clockwise (as viewed in FIG. 4) to rotate the switch shaft in the clockwise direction and cause cross pin 127 on the forward end of the switch shaft to engage stop 128 on the rotor and force the rotor to turn in the clockwise direction until the roller on the rotor is aligned with the restraining slot in the weight, which is then free to be driven by the bias springs back to the safe position shown in FIG. 3.

We claim:

1. An inertia-sensitive arming mechanism comprising a frame, means defining a primer chamber on the frame, a movable baffle disposed over the chamber, a weight secured to the frame to be movable relative to the frame from a first to a second position when the frame is accelerated, means for moving the baffle to uncover the primer chamber when the weight is moved relative to the frame from the first to the second position, a primer circuit, switching means for activating the circuit, means responsive to movement of the weight relative to the frame from the first to the second position for operating the switching means to activate the primer circuit, and means for manually deactivating the primer circuit after it has been activated by movement of the weight from the first to the second position and for returning the weight to the first position.

2. An inertia-sensitive arming mechanism comprising a frame, means defining a primer chamber on the frame, a movable baffle disposed over the chamber, a weight secured to the frame to be movable relative to the frame from a first to a second position when the frame is accelerated, means for moving the baffle to uncover the primer chamber when the weight is moved relative to the frame from the first to the second position, a primer circuit, switching means for activating the circuit, means responsive to movement of the weight relative to the frame from the first to the second position for operating the switching means to activate the primer circuit, and movable indicator means secured to the switching means to indicate when the circuit is activated.

3. An inertia-sensitive arming mechanism comprising a frame, means defining a primer chamber on the frame, a plate secured to the frame to be disposed over and spaced from the primer chamber, the plate having a port through it aligned with the primer chamber, a thin rupture disc secured to the plate across the port to seal the port, a movable baffle disposed over the chamber between the chamber and the plate, the baffle having an imperforate portion and a portion with a port through it, the baffle normally being positioned in a safe position with the imperforate portion disposed between the chamber and the plate port, the baffle being movable against the plate when in the safe position to seal the plate port and prevent rupture of the rupture disc in the event of accidental firing of a primer in the primer chamber when the baffle is in the safe position, a weight secured to the frame to be movable relative to the frame from a first to a second position when the frame is accelerated, means for moving the baffle to uncover the primer chamber by positioning the baffle port in alignment with the chamber and the plate port when the weight is moved relative to the frame from the first to the second position, a primer circuit, switching means for activating the circuit, means responsive to movement of the weight relative to the frame from the first to the second position for operating the switching means to activate the primer circuit, and means for manually deactivating the primer circuit after it has been activated by movement of the weight from the first to the second position and for returning the weight to the first position without disassembly of the arming mechanism.

4. An inertia-sensitive arming mechanism comprising a frame, means defining a primer chamber on the frame, a movable baffle disposed over the chamber, a weight secured to the frame to be movable relative to the frame from a first to a second position when the frame is accelerated, means for moving the baffle to uncover the primer chamber when the weight is moved relative to the frame from the first to the second position, a primer circuit, switching means for activating the circuit, means responsive to movement of the weight relative to the frame from the first to the second position for operating the switching means to activate the primer circuit, movable indicator means secured to the switching means to indicate when the circuit is activated, and testing means for operating the switching means to activate the primer circuit without moving the baffle to uncover the primer chamber.

References Cited by the Examiner

UNITED STATES PATENTS

| 2,720,749 | 10/1955 | Beebe | 60—35.6 |
| 2,871,658 | 2/1959 | Keck | 60—35.6 |
| 2,919,648 | 1/1960 | Jordan | 102—70.2 |
| 2,996,009 | 8/1961 | Donahue et al. | 102—76 |
| 3,084,506 | 4/1963 | Floyd et al. | 60—39.09 |

CARLTON R. CROYLE, *Primary Examiner.*

MARK NEWMAN, *Examiner.*